United States Patent [19]

Morelli et al.

[11] Patent Number: 5,112,915

[45] Date of Patent: * May 12, 1992

[54] COPOLYETHERESTER ELASTOMERIC COMPOSITIONS

[75] Inventors: Thomas A. Morelli, Pittsfield; Warren J. Peascoe, West Stockbrige; Stefan F. Rasch, Chesire; John A. Tyrell, Dalton, all of Mass.

[73] Assignee: General Electric Company, Pittsfield, Mass.

[ * ] Notice: The portion of the term of this patent subsequent to Feb. 12, 2008 has been disclaimed.

[21] Appl. No.: 511,923

[22] Filed: Apr. 16, 1990

Related U.S. Application Data

[63] Continuation of Ser. No. 279,353, Dec. 2, 1988, abandoned.

[51] Int. Cl.⁵ .................... C08L 67/02; C08L 33/08; C08L 25/12; C08L 25/14
[52] U.S. Cl. .................... 525/166; 525/64; 525/92; 525/173; 525/903
[58] Field of Search ............... 525/173, 64, 903, 166, 525/92

[56] References Cited

U.S. PATENT DOCUMENTS

| | | |
|---|---|---|
| 3,907,926 | 9/1975 | Brown et al. . |
| 3,944,631 | 3/1976 | Yu .................... 525/305 |
| 4,342,846 | 8/1982 | Silberberg .................... 525/64 |
| 4,469,851 | 9/1984 | Charles et al. . |
| 4,579,884 | 4/1986 | Liu . |
| 4,778,855 | 10/1988 | Boutni .................... 525/146 |
| 4,992,506 | 2/1991 | McCormick .................... 524/513 |

FOREIGN PATENT DOCUMENTS

| | | |
|---|---|---|
| 1431916 | 4/1976 | United Kingdom . |
| 2087903 | 6/1982 | United Kingdom .................... 525/64 |

*Primary Examiner*—Patricia Short
*Attorney, Agent, or Firm*—Hedman, Gibson, Costigan & Hoare

[57] ABSTRACT

Copolyetherester molding compositions comprising a copolyetherester and a modifying amount of a modulus reducing rubbery interpolymer comprising a crosslinked (meth)acrylate rubbery phase and an interpenetrating, crosslinked styrenic resin phase.

19 Claims, No Drawings

COPOLYETHERESTER ELASTOMERIC COMPOSITIONS

This is a continuation of U.S. patent application Ser. No. 279,353, filed Dec. 2, 1988, now abandoned.

CROSS-REFERENCE TO RELATED APPLICATIONS

This application is related to the following commonly owned related applications:

| Serial No. | Filed | Attys. Docket | Title | Applicants |
|---|---|---|---|---|
| 152,524 | 2/5/88 | 8CT-4901 (8CQ-9143) | Polyetherimide Ester Elastomeric Compositions | W. J. Peascoe J. A. Tyrell |
| 279,362 | 12/2/88 | 8CT-4903 | Polyetherimide Ester Elastomeric Molding Compositions | W. J. Peascoe J. A. Tyrell |
| 279,351 | 12/2/88 | 8CT-4904 | Copolyetheresters Elastomeric Compositions | M. R. McCormick T. Morelli W. J. Peascoe S. Rasch J. A. Tyrell M. T. Wong |

FIELD OF INVENTION

This invention relates to elastomeric compositions comprising copolyetheresters in combination with multistage elastomers comprised of a crosslinked alkyl acrylate phase which is interpenetrated by a crosslinked styrenic phase. Such compositions exhibit improved physical properties such as tensile properties.

BACKGROUND

Copolyetheresters are well known and have enjoyed continued and increasing commercial success. They are available from several sources including Hytrel ® resins from E. I. duPont and the RITEFLEX resins from Celanese (formerly GAFLEX from GAF) and are described in U.S. Pat. Nos. 3,023,192; 3,651,014; 3,763,109; 3,766,146; 3,784,520; 3,801,547; 4,156,774; 4,264,761 and 4,355,155, among others. These copolyetheresters have a number of desirable properties including excellent tear strength, flex life, toughness, and general elastomeric stress-strain characteristics.

It has been found that polyetheresters can be improved or enhanced for certain applications, especially with respect to improving the "softness" (i.e., lower durometer) of the elastomer, while retaining satisfactory tensile properties.

The improvements are accomplished by the incorporation of effective amounts of certain rubber modifiers of the type known as multistage interpolymers. It is surprising, however, that elastomeric compositions incorporating the selected rubber modifiers can be processed to avoid the delamination or phase separation (or so-called "cheesiness") expected for the combination of thermoplastic elastomers and typical rubber products.

In particular it has been found that copolyetherester elastomers can be improved by incorporation of effective amounts of rubber modifiers characterized as a multi-stage, or sequentially produced interpolymer product, specifically a thermoplastic elastomer comprised of a crosslinked polyacrylate rubbery phase which is interpenetrated by a crosslinked styrenic phase. This multistage interpolymer elastomer has been added to thermoplastic resins. See, for example, above mentioned U.S. patent application Ser. No. 152,524 filed Feb. 5, 1988.

It has now been surprisingly found that effective amounts of the aforementioned multistage polymer modifier can be combined with a copolyetherester and the elastomeric product will thereupon exhibit improved "softness" while retaining satisfactory tensile properties.

It is an object of the present invention to provide thermoplastic elastomeric molding compositions which are suitable for a broad range of end use applications having sufficient flexural modulus so as to provide molded parts with good physical integrity and stiffness.

SUMMARY OF THE INVENTION

In accordance with the present invention there are provided improved thermoplastic elastomeric compositions having good flexural modulus and, more importantly, better softness (lower durometer), while retaining good elongation properties as compared to unmodified copolyetheresters, the compositions comprising:

(A) one or more thermoplastic copolyetheresters and (B) a modulus reducing amount of a rubbery interpolymer comprising a crosslinked (meth)acrylate rubbery phase and an interpenetrating, crosslinked styrenic resin phase.

The amount employed can vary broadly. However, preferred compositions comprise from 5 to 95 parts by weight of (A), more preferably from 20 to 80 parts by weight and, correspondingly, from 95 to 5 parts by weight of (B), more preferably from 80 to 20 parts by weight.

DETAILED DESCRIPTION OF THE INVENTION

Suitable thermoplastic copolyetheresters (A) include both random and block copolymers. In general these are prepared by conventional esterification/polycondensation processes from (i) one or more diols, (ii) one or more dicarboxylic acids, (iii) one or more long chain ether glycols, and optionally, (iv) one or more lactones or polylactones.

Diols (i) which can be used in the preparation of the copolyetheresters include both saturated and unsaturated aliphatic and cycloaliphatic dihydroxy compounds. These diols are preferably of low molecular weight, i.e. having molecular weight of about 300 or less.

When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are generally those having from about 2 to about 15 carbon atoms, including ethylene glycol; propanediol; butanediol; pentanediol; 2-methyl propanediol; 2,2-dimethyl propanediol; hexanediol; decanediol; 2-octyl undecanediol; 1,2, -1,3 and 1,4-dihydroxy cyclohexane; 1,2-, 1,3-, and 1,4-cyclohexane dimethanol; butenediol; hexenediol; etc. Especially preferred are 1,4-butanediol and mixtures thereof with hexanediol or butenediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed it is preferred that at least about 60 mole percent, most preferably at least 80 mole percent, based on the total diol content, be the same diol. As mentioned above, the preferred thermoplastic elastomers are those in which 1,4-butanediol is present in a predominant amount.

Dicarboxylic acids (ii) which are suitable for use in the preparation of the copolyetheresters include aliphatic, cycloaliphatic, and/or aromatic dicarboxylic acids. These acids are preferably of a low molecular weight, i.e. having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro2,6-naphthalene dicarboxylic acid, 4,4- methylenebis(cyclohexane carboxylic acid), 3,4-furandicarboxylic acid, and 1,1-cylobutanedicarboxylic acid. Preferred aliphatic acids are cyclohexanedicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene, 1,2-bis-(p-oxybenzoic acid), 1,5-naphthalenedicarboxylic acid, 2,6-naphthalene dicarboxylic acid, 2,7-naphthalene dicarboxylic acid, phenanthrenedicarboxylic acid, anthracenedicarboxylic acid, 4,4'-sulfonyldibenzoic acid, and halo and $C_1$-$C_{12}$ alkyl, alkoxy, and aryl ring substitution derivatives thereof. Hydroxy acids such as p-(beta-hydroxyethoxy)benzoic acid can also be used provided an aromatic dicarboxylic acid is also present.

Preferred dicarboxylic acids for the preparation of the copolyetheresters are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed, it is preferred that at least about 60 mole percent preferably at least about 80 mole percent, based on 100 mole percent of dicarboxylic acid (ii) be of the same dicarboxylic acid or ester derivative thereof. As mentioned above, the preferred copolyetheresters are those in which dimethyl terephthalate is the predominant dicarboxylic acid.

Suitable long chain ether glycols (iii) which can be used in the preparation of the thermoplastic elastomers are preferably poly(oxyalkylene)glycols and copoly(oxyalkylene)glycols of molecular weight of from about 400 to 12000. Preferred poly(oxyalkylene) units are derived from long chain ether glycols of from about 900 to about 4000 molecular weight and having a carbon-to-oxygen ratio of from about 1.8 to about 4.3, exclusive of any side chains.

Representative of suitable poly(oxyalkylene) glycols there may be given poly(ethylene ether)glycol; poly(propylene ether)glycol; poly(tetramethylene ether) glycol; random or block copolymers of ethylene oxide and propylene oxide, including ethylene oxide end capped poly(propylene ether)glycol and predominately poly(ethylene ether) backbone, copoly(propylene ether-ethylene ether) glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene) glycols are poly(propylene ether)glycol, poly(tetramethylene ether) glycol and predominately poly(ethylene ether) backbone copoly(propylene ether-ethylene ether)glycol.

Optionally, these copolyetheresters may have incorporated therein one or more lactones or polylactones (iv). Such lactone modified copolyetheresters are disclosed in pending U.S. patent application Ser. No. 643,985 filed Aug. 24, 1984.

Lactones (iv) suitable for use herein are widely available commercially, e.g., Union Carbide Corporation and Aldrich Chemicals. While epsilon caprolactone is especially preferred, it is also possible to use substituted lactones wherein the lactone is substituted by a lower alkyl group such as a methyl or ethyl group at the alpha, beta, gamma, delta, or epsilon positions. Additionally, it is possible to use polylactone, including homopolymers and copolymers thereof with one or more components, as well as hydroxy terminated polylactone, as block units in the novel copolyetheresters of the present invention. Suitable polylactones and processes for their production are described in for example, U.S. Pat. Nos. 3,761,511; 3,767,627, and 3,806,495.

In general, suitable copolyetherester elastomers (A) are those in which the weight percent of (iii) long chain ether glycol component or the combined weight percent of (iii) long chain ether glycol component and (iv) lactone component in the copolyetherester is from about 5 to about 80 weight percent. Preferred composition are those wherein the weight percent of (iii) or (iii) and (iv) is from about 10 to 50 weight percent.

As described above, the copolyetheresters may be prepared by conventional esterification/condensation reactions for the production of polyesters. Exemplary of the processes that may be practiced are as set forth in for example, U.S. Pat. Nos. 3,023,192; 3,763,109; 3,651,014; 3,663,653 and 3,801,547. Additionally, these compositions may be prepared by such processes and other known processes to effect random copolymers, block copolymers or hybrids thereof wherein both random and block units are present. For example, it is possible that any of two or more of the foregoing monomers/reactants may be prereacted prior to polymerization of the final copolyetheresters. Alternatively a two part synthesis may be employed wherein two different diols and/or dicarboxylic acids are each prereacted in separated reactors to form two low molecular weight prepolymers which are then combined with the long chain ether glycol to form the final triblock copolyetherester.

The foregoing thermoplastic copolyetheresters (A) are modified in accordance with the teachings of the instant invention by admixing therewith a modifying amount of (B) of a rubbery multistage interpolymer modifier.

The rubbery, multistage interpolymer modifier is comprised of a crosslinked acrylate rubbery phase and an interpenetrating crosslinked styrenic resin phase. The two phases, produced in sequential fashion, maintain integrity as a result of the crosslinking of the interpenetrating polymer chains. As a consequence, it is not necessary to graft the second phase onto the first although such a grafting step could be utilized if desired. The exact structure of the multistage interpolymer is not known but a reasonable conjecture maintains that a core of crosslinked acrylate rubber is formed in the first step which is then surrounded and interpenetrated by styrenic resin, which is crosslinked thereby forming the integral multistage interpolymer. Whether this crosslinked styrenic phase forms a complete or discontinuous "shell" around the core depends on reaction conditions as well as quantities of polymer utilized.

The multistage, interpolymer modifiers of the present invention are those having a crosslinked (meth)acrylate rubbery phase, preferably butyl acrylate. Associated with this crosslinked rubbery phase is a phase comprised of crosslinked styrenic resin, preferably styrene, which interpenetrates the crosslinked rubbery phase. Incorporation of small amounts of other monomers such as acrylonitrile or (meth)acrylonitrile within the resin also provides products within the scope of this invention. The interpenetrating network is provided when the monomers forming the resin phase are polymerized and crosslinked in the presence of the previously polymerized and crosslinked (meth)acrylate rubbery phase.

The interpolymer compositions may be formed by the following two-step, sequential polymerization process:

1. emulsion polymerizing an acrylate monomer charge of at least one $C_2$–$C_{10}$ alkyl or alkoxyalkyl acrylate, $C_8$–$C_{12}$ alkyl or alkoxyalkyl (meth)acrylate, or compatible mixtures thereof (all of which may be referred to as (meth) acrylate), in an aqueous polymerization medium in the presence of an effective amount of a suitable di or polyfunctional ethyleneically unsaturated crosslinking agent for such type of monomer, with the $C_4$–$C_8$ alkyl or alkoxyalkyl acrylates being the preferred acrylate monomers for use in this step;

2. emulsion polymerizing a monomer charge of styrene or styrene/(meth)acrylonitrile in an aqueous polymerization medium, also in the presence of an effective amount of a suitable di or polyfunctional ethyleneically unsaturated crosslinking agent for such monomers, said polymerization being carried out in the presence of the product from Step 1 so that the crosslinked (meth)acrylate and crosslinked vinyl aromatic. e.g., styrene or styrene/(meth)acrylonitrile components from an interpolymer wherein the respective phases interpenetrate one another.

The final multistage rubbery product that is formed thereby can be isolated and dried.

In greater detail, in conducting the aqueous emulsion polymerization step leading to the preparation of the crosslinked (meth)acrylate rubbery phase, there is preferably first prepared a monomer charge comprising an aqueous mixture containing about 10 to 50 percent by weight, of one or more monomers, the identity of which will be described in detail hereinbelow and from about 0.2 to 2.0 percent weight of the monomer mixture, of a catalyst. The mixture is then heated at a temperature of from about 40 degrees to 95 degrees C. for a period of about 0.5 to about 8 hours.

The (meth)acrylic elastomer phase comprises crosslinked (meth)acrylic polymers or copolymers having a Tg. i.e., a glass transition temperature, of less than about 25 degrees C. These can be polymerized by means of free radical initiated emulsion techniques. These (meth) acrylic elastomer polymers should be crosslinked so that they can retain their integrity during subsequent polymer processing steps. This crosslinking can be achieved during the polymerization of the elastomer if a polyfunctional ethyleneically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of (meth)acrylic elastomers that can be used include the crosslinked polymers of the $C_2$–$C_{10}$ alkyl acrylate and the $C_8$–$C_{12}$ alkyl methacrylate monomers, preferably the $C_2$–$C_8$ alkyl acrylates, such as poly(n-butyl acrylate), poly(ethyl acrylate) and poly(2-ethylhexyacrylate). At least one acrylate monomer is utilized in this step. If desired, the monomer charge may contain small amounts, i.e., 1 to 20 percent by weight of the amount of acrylate monomer, of optional monomers including styrene, acrylonitrile, methacrylonitrile, methyl methacrylate, methacrylic acid, acrylic acid, vinylidene chloride, vinyl toluene and any other ethyleneically unsaturated monomer copolymerizable with the acrylate monomer selected for use. Special mention is made of alkoxyalkyl (meth)acrylates, specifically ethoxyethyl and methoxyethyl (meth)acrylates, and acrylonitrile which will improve oil resistance while maintaining a low Tg.

In order to crosslink the (meth)acrylate monomer, from about 0.05 to about 10, preferably 0.1 to 5 percent by weight based on the weight of acrylate monomer, of at least one crosslinking agent is used. This crosslinking agent is for the purposes of this invention a di or polyfunctional ethylenically unsaturated monomer having at least one vinyl group of the formula:

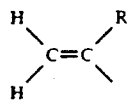

wherein R is hydrogen or lower alkyl. As is well known in the art the vinyl groups on the crosslinking monomer can be the same, e.g., divinyl benzene, trimethylolpropane triacrylate, etc., or different, e.g. allyl methacrylate, diallyl fumarate, diallyl maleate, etc. Examples of other suitable crosslinking monomers which are known to persons in the art and which can be used are triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, diethylene glycol diacrylate, diethylene glycol dimethacrylate, 1,6-hexanediol diacrylate, 2,2-dimethylpropane 1,3-diacrylate, triallyl isocyanurate, divinyl benzene, pentaerythritol tetramethacrylate, dipentaerythritol monohydroxy-pentaacrylate, pentaerythritol triacrylate, ethoxylated trimethylolpropane triacrylate, polyethylene glycol diacrylate, tetraethylene glycol diarylate, pentaerythritol tetraacrylate, 1,3-butylene glycol dimethacrylate, tripropylene glycol diacrylate, ethoxylated bisphenol A dimethyacrylate, ethoxylated trimethylolpropane trimethacrylate, mixtures of any of the foregoing, and the like.

Optimum results are obtained by the use of a crosslinked copolymer containing from about 95 to 99.9 percent by weight of n-butyl acrylate and from about 0.1 to about 5 percent by weight, of butylene glycol diacrylate.

The emulsifier which is used is at least one of the following conventional types: an anionic emulsifier, e.g., the $C_2$-$C_{22}$ carboxylic acids, the sulfates or, sulfonates of $C_6$-$C_{22}$ alcohols or allyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier should be present from about 0.5 to about 5 percent by weight in the emulsion.

In the prior disclosure of Yu et al., U.S. Pat. No. 3,944,631, it has been found that regardless of the particular emulsifier being utilized in preparing the rubber polymer latex, its polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in about several portions, the resulting polymerization reaction remains controllable and overheating and coagulation can be prevented. An initiator is also present in the emulsion in an amount ranging from about 0.0005 to 2 percent by weight of the (meth)acrylate monomer. Suitable for use are water soluble peroxidic compounds, e.g., hydrogen peroxide and alkali metal and ammonium persulfates, oil soluble organic peroxides and azo compounds, e.g., benzoylperoxide, azobisisobutyronitrile and the like, used singly or in combination. Redox catalysts, e.g., such as hydrazine, alkali metal bisulfites, thiosulfates, and hydrosulfites, and soluble oxidizable sulfoxyl compounds can also be used. Preferred as the initiator herein is ammonium persulfate.

A chain transfer agent as an alkyl mercaptan, e.g., t-dodecyl mercaptan, toluene, xylene, chloroform, halogenated hydrocarbons and the like may also be used. A buffer to adjust the pH may be used.

The next step in the preferred embodiment of preparing the interpolymers used herein is the emulsion polymerization of a mixture of vinyl aromatic monomers, e.g., styrene or styrene and acrylonitrile, in the presence of minor portion of at least one difunctional or polyfunctional crosslinking monomer to form, for example, a crosslinked styrene homopolymer or styrene-acrylonitrile co-polymer. This emulsion polymerization is carried out in the presence of the crosslinked (meth)acrylate rubbery phase by adding the styrene or styreneacrylonitrile charge to the previously prepared aqueous emulsion of crosslinked (meth)acrylate rubbery phase. The amount of styrene or styrene-acrylonitrile which is added ranges from about 60 to about 10, preferably from about 50 to about 20 percent based upon the weight of the final product which will be formed. When present, (meth)acrylonitrile preferably comprises from about 15 to about 45 parts by weight to, correspondingly, about 85 to about 55 parts of vinyl aromatic monomer.

The monomer charge of styrene-acrylonitrile, when such a combination is used, can comprise from about 55:45 to about 85:15 weight parts of styrene to acrylonitrile with the most preferred ratio being about 76:24. If desired, minor amounts, e.g., below about 20 percent by weight, of optional monomers can be included. Examples are t-butyl styrene, p-chlorostyrene, alpha-methylstyrene, methyl methacrylate, alkyl acrylate, vinylidene chloride, ethylene, propylene, isobutylene and other ethyleneically compounds copolymerizable with styrene and styrene-acrylonitrile.

The crosslinking agent, emulsifiers, initiators, and chain transfer agents discussed in the previous step can also be used in this step in the same amounts to form the interpenetrating crosslinked stryene-acrylonitrile resin phase associated with the rubbery phase.

Other additives can be used as conventional light, thermal and ultraviolet light stabilizers, flame retardants, antioxidants, dyes, pigments, mineral additives and extending fillers and reinforcing agents.

The compositions of the present invention may be prepared by any of the well known techniques for preparing polymer blends of admixtures, with extrusion blending being preferred. Suitable devices for the blending include single screw extruders, twin screw extruders, internal mixers such as the Banbury Mixer, heated rubber mills (electric or oil heat) or Farrell continuous mixers. Injection molding equipment can also be used to accomplish blending just prior to molding but care must be taken to provide sufficient time and agitation to insure uniform blending prior to molding.

Alternative methods include dry blending prior to extrusion or injection molding as well as precompounding.

The polymer compositions prepared in accordance with the present invention are suitable for a broad range of molding applications.

DESCRIPTION OF THE PREFERRED EMBODIMENTS

The following examples show preferred embodiments of the compositions and processes of the claimed invention and the products formed therefrom. They are illustrative and are not intended to limit the claims in any way whatsoever.

The following copolyetheresters were used in exemplifying the present invention.

Polymers A1, A2, A3, A4 and A5

Polymer A1 is a random copolyetherester derived from 25 parts of butanediol, 48 parts dimethylterephthalate. 14 parts hexanediol and 13 parts poly(tetramethylene ether)glycol (MW 2000). Polymer A2 and is a random copolyetherester derived from 22 parts butanediol, 12 parts hexanediol, 42 parts dimethylterephthalate and 24 parts poly(tetramethylene ether)glycol(MW 2000).

Polymer A3 is available from E. I. duPont as Hytrel® 4056.

Polymer A4 is available from E. I. duPont as Hytrel® 6346.

Polymer A5 is available from E. I. duPont as Hytrel® G6356.

POLYMERS B1 AND B2

Polymer B1: Preparation of XL Acrylate/XL Styrene Interpolymer

A thermoplastic elastomer comprising a crosslinked poly(butyl acrylate) and an interpenetrating, crosslinked polystyrene resin phase is prepared in a five liter, three-necked flask equipped with a heating/cooling jacket, a Teflon blade agitator, a thermometer, and a nitrogen purge.

The following solutions are prepared:

| Solution A: | n-butyl acrylate | 751.4 g |
|---|---|---|
| | 1,3-butyleneglycol diacrylate | 1.27 g |
| Solution B: | sodium metabisulfite | 1.75 g |
| | deionized water | 27.4 g |
| Solution C: | ammonium persulfate | 4.84 g |
| | deionized water | 76.1 g |
| Solution D: | styrene | 250.6 g |
| | divinyl benzene | 2.65 g |

(55% active solution Dow Chemical)

Into the reaction flask is charged: 3,460 g deionized water, the following emulsifying agents: 2.1 g Sipex UB sodium lauryl sulfate (from Alcolac, Inc.) and 4.2 g Aersol A-268, a disodium sulfosuccinate (from American Cyanamid), and 14.6 g of Solution B. The flask is stirred and sparged with $N_2$ at room temperature for 30 minutes, to reduce the $O_2$ content.

Thereafter, 150.5 g of $N_2$ spared Solution A is added. The flask contents are heated to 55 degrees C. and then 13.5 g Solution C. is added to initiate polymerization.

After 1.5 hours of reaction, a sample shows 4.1% resin solids indicating approximately 96% percent conversion. The remainder of Solution A as well as 14.6 g Solution B and 40.4 g Solution C are added. After 2.5 hours of additional reaction time at 55 degrees C., a sample shows 17.2 percent resin solids, indicating greater than 97 percent conversion.

The reaction mixture is cooled to 35 degrees C. and Solution D is added and mixed for 15 minutes at 35 degrees C. The reaction mixture is then heated to 60 degrees C. and the remainder of Solution C is added. The mixture was reacted for 1.25 hours. The temperature is raised to 75 degrees C. and maintained for 45 minutes. A final sample shows 22.4 percent resin solids indicating a conversion greater than 98 percent.

The product latex is coagulated in a solution of 0.25 weight percent $CaCl_2$ in methanol at a rate of 1600 ml methanol per 800 ml latex. The coagulum is filtered, rinsed with fresh water, and dried in a vacuum oven at 60 degrees C.

The product has a rubber content of 75% by weight, a number average latex particle diameter of 211 nanometers, a swell index in methyl ethyl ketone (MEK) of 8.1 and a percent gel fraction from MEK extraction of 91.1 percent.

POLYMER B2: PREPARATION OF XL ACRYLATE/XL STYRENE ACRYLONITRILE INTERPOLYMER

A thermoplastic elastomer comprising a crosslinked poly(butyl acrylate) rubbery phase and a crosslinked poly(styrene-co-acrylonitrile) resin phase is prepared according to the method of the previous preparation except that 30 weight percent of the styrene is replaced with acrylonitrile and 70 weight percent styrene monomers are used in Solution D.

EXAMPLES 1-6

Compositions in accordance with this invention are prepared by dry blending, extruding, and molding copolyetheresters and interpolymer modifiers. For comparison purposes compositions are prepared also from polyester and one of the interpolymer modifiers. In addition, workpieces are molded from the individual components and all are tested for durometer hardness, and tensile and elongation properties in a single-gated and a double-gated mold. The formulations used and the results obtained are set forth in the table as follows:

TABLE

COMPOSITIONS COMPRISING POLYETHERESTER COPOLYMERS AND (METH)ACRYLATE-CROSSLINKED STYRENIC INTERPOLYMERS

| Example | 1A* | 1B* | 1C* | 1D* | 1E* | 1F* | 1G* | 1H* | 1I* | 1J* | 1 |
|---|---|---|---|---|---|---|---|---|---|---|---|
| Compositions (parts by weight) | | | | | | | | | | | |
| Polyetherester Copolymer$^a$ | 100 | — | — | — | — | — | — | — | — | — | 50 |
| Polyetherester Copolymer$^b$ | — | 100 | — | — | — | — | — | — | — | — | — |
| Polyetherester Copolymer$^c$ | — | — | 100 | — | — | — | — | — | — | — | — |

TABLE-continued
COMPOSITIONS COMPRISING POLYETHERESTER COPOLYMERS AND (METH)ACRYLATE-CROSSLINKED STYRENIC INTERPOLYMERS

| | | | | | | | | | | | |
|---|---|---|---|---|---|---|---|---|---|---|---|
| Polyetherester Copolymer[d] | — | — | — | 100 | — | — | — | — | — | — | — |
| Polyetherester Copolymer[e] | — | — | — | — | 100 | — | — | — | — | — | — |
| Polyester[f] | — | — | — | — | — | 100 | — | — | — | — | — |
| Polyester[g] | — | — | — | — | — | — | 100 | — | — | — | — |
| Polyester[h] | — | — | — | — | — | — | — | 100 | — | — | — |
| Interpolymer[i] | — | — | — | — | — | — | — | — | 100 | — | 50 |
| Interpolymer[j] | — | — | — | — | — | — | — | — | — | 100 | — |
| Properties | | | | | | | | | | | |
| Durometer Shore A | 97 | 95 | 86 | 93 | 93 | — | — | — | 60 | 58 | 90 |
| Shore D | 44 | 34 | 34 | 54 | 52 | — | — | — | 14 | 10 | 27 |
| Double Gate Tensile, psi** | 1500 | 2000 | 1500 | 3900 | 4200 | 8500 | 8100 | 8500 | 430 | — | 840 |
| Elong. % | >500 | >500 | >500 | >500 | >500 | 80 | 450 | 470 | >500 | 370 | 140 |
| Tensile, psi | 2900 | 3200 | 1900 | 5700 | 4500 | 8000 | 7100 | 7900 | 600 | 330 | 2200 |
| Elong. % | >500 | >500 | >500 | >500 | 450 | 260 | 300 | 230 | >500 | 190 | >500 |
| Tensile @ 100% Elong. | 1800 | 1300 | 950 | 2600 | 2700 | 4200 | 4500 | 4100 | 290 | 290 | 1100 |

| Example | 2 | 3 | 4 | 5 | 6 | 6A* | 6B* | 6C* |
|---|---|---|---|---|---|---|---|---|
| Compositions (parts by weight) | | | | | | | | |
| Polyetherester Copolymer[a] | — | — | — | — | — | — | — | — |
| Polyetherester Copolymer[b] | 50 | — | — | — | 50 | — | — | — |
| Polyetherester Copolymer[c] | — | 50 | — | — | — | — | — | — |
| Polyetherester Copolymer[d] | — | — | 50 | — | — | — | — | — |
| Polyetherester Copolymer[e] | — | — | — | 50 | — | — | — | — |
| Polyester[f] | — | — | — | — | — | 50 | — | — |
| Polyester[g] | — | — | — | — | — | — | 50 | — |
| Polyester[h] | — | — | — | — | — | — | — | 50 |
| Interpolymer[i] | 50 | 50 | 50 | 50 | — | 50 | 50 | 50 |
| Interpolymer[j] | — | — | — | — | 50 | — | — | — |
| Properties | | | | | | | | |
| Durometer Shore A | 81 | 80 | 90 | 89 | 83 | 93 | 94 | 92 |
| Shore D | 23 | 23 | 32 | 31 | 22 | 45 | 44 | 37 |
| Double Gate Tensile, psi** | 800 | 750 | 1000 | 1100 | 800 | 1500 | 1200 | 1200 |
| Elong. % | >500 | >500 | 50 | 120 | >500 | 6 | 4 | 9 |
| Tensile, psi | 1500 | 1700 | 2900 | 2500 | 1500 | 2500 | 2900 | 2100 |
| Elong. % | >500 | >500 | >500 | >500 | >500 | 70 | 170 | 70 |
| Tensile @ 100% Elong | — | 700 | 500 | 1400 | 830 | — | — | — |

[a] Polymer A1
[b] Polymer A2
[c] Dupont Hytrel ® 4056, Polymer A3
[d] Dupont Hytrel ® 6346, Polymer A4
[e] Dupont Hytrel ® G6350, Polymer A5
[f] General Electric Valox ® 295, poly(1,4-butylene terephthalate)
[g] General Electric Valox ® 315, poly(1,4-butylene terephthalate)
[h] Eastman Kodak, Tenite ® 7352, poly(ethylene terephthalate)
[i] XL-Acrylate/XL Styrene, Polymer B1
[j] XL-Acrylate/XL Styrene-Acrylonitrile, Polymer B2
*Comparative Example
**Modified tensile bar ⅛" thick 5 inch overall, 1 in nominal gauge overall length, ¼ inch gauge width The foregoing data demonstrate that compositions of copolyetheresters (Examples 1-6) retain good tensile properties (good elongation) in comparison with Examples 6A*, 6B*, and 6C*. Further illustrative of decreased compatability with polyester is poor double gated tensile elongation (Comparative Examples 6A*-6C*; 6%, 4%, and 9%). It is unexpected that the compositions of this invention would have such good double gated tensile elongations, ranging from 50% to greater than 500%.

The above mentioned patents, applications and publications, if any, are incorporated herein by reference.

Many variations will suggest themselves to those skilled in the art in light of the above, detailed description. All such variations are within the full intended scope of the appended claims.

What is claimed is:

1. A thermoplastic elastomer composition consisting essentially of:
   (A) at least one copolyetherester; and
   (B) a softness improving amount of a rubbery interpolymer comprising a crosslinked (meth)acrylate rubbery phase and an interpenetrating, crosslinked styrenic phase, said interpolymer being free of any graftlinking; wherein said copolyetherester is the reaction product of monomers consisting of
   (i) one or more diols;
   (ii) one or more dicarboxylic acids or an ester derivatives thereof;
   (iii) one or more long chain ether glycols having a molecular weight of from about 400 to about 12000; and, optionally,
   (iv) one or more lactones, wherein the long chain ether glycol and lactone, if any, comprise from about 5 to about 70 weight percent of the copolyetherester.

2. A composition as defined in claim 1 wherein the copolyetherester is derived from:
   (i) one or more $C_2$ to $C_{20}$ aliphatic or cycloaliphatic diols;
   (ii) one or more $C_4$ to $C_{36}$ dicarboxylic acids;
   (iii) one or more poly(alkylene ether)glycols having a molecular weight of from about 900 to about 4000; and, optionally,
   (iv) one or more lactones, and wherein:
   (a) at least 60 mole percent of the diols are the same;
   (b) at least 60 mole percent of the dicarboxylic acids are the same; and (c) the combined amount of long chain ether glycol and lactone, if any, in the copolyetherester is from about 10 to about 50 weight present.

3. A composition as defined in claim 2 wherein at least about 80 mole percent of the diols and at least about mole percent of the dicarboxylic acids are the same.

4. A composition as defined in claim 2 wherein the dicarboxylic acid is selected from the group consisting of hexahydrophthalic anhydride, $C_{36}$ dimer acid, and dimethyl terephthalate.

5. A composition as defined in claim 1 wherein the predominant dicarboxylic acid is dimethyl terephthalate.

6. A composition as defined in claim 4 wherein the predominant dicarboxylic acid is dimethyl terephthalate.

7. A composition as defined in claim 1 wherein the poly(alkylene ether)glycol is selected from a group consisting of poly(ethylene ether)glycol, poly(propylene ether)glycol, poly(tetramethylene ether)glycol, and copoly(propyleneetherethylene ether)glycol.

8. A composition as defined in claim 7 wherein the poly(alkylene ether)glycol is poly(tetramethylene ether) glycol.

9. A composition as defined in claim 1 wherein the copolyetherester contains a lactone in an amount of from about 2 to about 50 percent by weight.

10. A composition as defined in claim 9 wherein the copolyetherester contains a lactone in an amount of from about 10 to about 30 percent by weight.

11. A composition as defined in claim 9 wherein the lactone is epsilon caprolactone.

12. A composition as defined in claim 10 wherein the lactone is epsilon caprolactone.

13. A composition as defined in claim 1 wherein the rubbery phase of said crosslinked (meth)acrylate comprises a crosslinked alkyl or alkoxyalkyl (meth)acrylate.

14. A composition as defined in claim 13 wherein said (meth)acrylate comprises butyl acrylate.

15. A composition as defined in claim 1 wherein said crosslinked styrenic resin is crosslinked polystyrene.

16. A composition as defined in claim 1 wherein said crosslinked styrenic resin is crosslinked styrene-acrylonitrile copolymer.

17. A composition as defined in claim 1 wherein the copolyetherester is present in an amount of, approximately, 5 to 95 parts by weight and, correspondingly, the rubbery interpolymer is present in an amount of, approximately 95 to parts by weight, based upon 100 parts by weight of both polymers taken together.

18. A composition as defined in claim 17 comprising 20 to 80 parts by weight copolyetherester and correspondingly 80 to 20 parts by weight rubbery interpolymer based upon 100 parts by weight of both polymers taken together.

19. An article comprising a thermoplastic elastomeric composition as defined in claim 1.

* * * * *